United States Patent
Donoho

(10) Patent No.: US 12,076,894 B2
(45) Date of Patent: Sep. 3, 2024

(54) METHOD OF MANUFACTURING AN INSERTION MOLDED BIRD SPIKE

(71) Applicant: Bird B Gone LLC, Santa Ana, CA (US)

(72) Inventor: Bruce Donoho, Laguna Beach, CA (US)

(73) Assignee: Bird-B-Gone, Inc., Santa Ana, CA (US)

( * ) Notice: Subject to any disclaimer, the term of this patent is extended or adjusted under 35 U.S.C. 154(b) by 0 days.

(21) Appl. No.: 17/887,404

(22) Filed: Aug. 12, 2022

(65) Prior Publication Data

US 2024/0051201 A1 Feb. 15, 2024

(51) Int. Cl.
 *B29C 45/14* (2006.01)
 *B29K 69/00* (2006.01)
 *B29K 705/00* (2006.01)

(52) U.S. Cl.
 CPC .. *B29C 45/14221* (2013.01); *B29C 45/14065* (2013.01); *B29C 2045/14229* (2013.01); *B29K 2069/00* (2013.01); *B29K 2705/00* (2013.01)

(58) Field of Classification Search
 CPC ........ B29C 45/14221; B29C 45/14065; B29C 2045/14229; B29C 2045/14139
 See application file for complete search history.

(56) References Cited

U.S. PATENT DOCUMENTS

| | | | | |
|---|---|---|---|---|
| 7,040,058 B2 * | 5/2006 | Finkelstein | ........... | A01M 29/32 52/60 |
| 7,243,465 B2 * | 7/2007 | Donoho | .............. | B29C 45/0001 119/713 |
| 7,596,910 B1 * | 10/2009 | Donoho | ................ | E04D 13/004 43/1 |
| 7,802,405 B1 * | 9/2010 | Donoho | ................ | A01M 29/32 52/24 |
| 8,479,456 B1 * | 7/2013 | Donoho | ................ | A01M 29/32 43/1 |
| 8,689,498 B2 * | 4/2014 | Donoho | .................. | B29C 45/00 43/1 |
| 2004/0216393 A1 * | 11/2004 | Hall | ....................... | A01M 29/32 52/27 |
| 2005/0160685 A1 * | 7/2005 | Donoho | .............. | B29C 45/0001 52/101 |

(Continued)

FOREIGN PATENT DOCUMENTS

| GB | 2402861 | * 12/2004 |
|---|---|---|
| JP | 2011050266 | * 3/2011 |

(Continued)

*Primary Examiner* — Edmund H Lee
(74) *Attorney, Agent, or Firm* — Fish IP Law, LLP

(57) ABSTRACT

A bird spike is insertion molded, using a technique in which a wire that forms at least one of the spikes is bent while coupled to one of the mold parts, and a molten plastic is injected about at least a bent portion of the bent first wire. The wire can be bent before the mold closes but after attachment to the mold, while the mold is closing, and/or after the mold is closed. The wire can be bent in any suitable manner, preferably having first and second bends of at least 60°, and a bump of at least 1 mm between the first and second bends. A robot arm can be used to concurrently secure multiple straight wires from a wire holder platform, and positioned them onto the mold part.

23 Claims, 7 Drawing Sheets

(56) References Cited

U.S. PATENT DOCUMENTS

2014/0041318 A1\* 2/2014 Donoho ................. B29C 45/00
                                                                               52/101
2018/0116203 A1\* 5/2018 Donoho ............... F16M 13/022

FOREIGN PATENT DOCUMENTS

| WO | WO2004017730 | \* | 3/2004 |
| WO | WO2005029955 | \* | 4/2005 |

\* cited by examiner

METHOD OF MANUFACTURING AN INSERTION MOLDED BIRD SPIKE

FIELD OF THE INVENTION

The field of the invention is animal deterrent manufacturing, especially as related to bird deterrent devices.

BACKGROUND

The background description includes information that may be useful in understanding the present invention. It is not an admission that any of the information provided herein is prior art or relevant to the presently claimed invention, or that any publication specifically or implicitly referenced is prior art.

Birds can present a nuisance when lading on a roof, awning, gutter or other surfaces. Many different types of devices have been deployed to prevent such landings, including both electrified and non-electrified devices.

A particularly useful type of non-electrified device is a bird spike, which generally includes a base for attachment to a roof or other surface, and multiple upwardly facing spikes that interfere with landing. Embodiments with plastic spikes are known, as well as embodiments with wire spikes. Bird spikes with wire spikes embedded in a plastic base are preferable for some situations, but are relatively expensive to produce because the wires need to have a bend within the plastic to prevent the wires from rotating away from an upright position. As used herein a "deterrent bird spike" is used interchangeably with the term "deterrent device", and includes a base from which extend multiple metal wire spikes.

The most popular wire bird spikes are manufactured by bending the wires, molding a base with holes for the wires, inserting the wires into the holes, and then either crushing or melting the plastic in a region near the insertion holes. That process is time consuming, and can be problematic for longer bases using more than five or six wires.

Accordingly, there is a need for automated processes of producing metal wire bird spikes.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a bird spike is insertion molded, using a technique in which a wire that forms at least one of the spikes is bent while coupled to one of the mold parts, and a molten plastic is injected about at least a bent portion of the bent first wire. The injected plastic is preferably a polycarbonate, but can be any suitable polymer.

In various embodiments, the wire can be bent before the mold closes but after attachment to the mold, while the mold is closing, and/or after the mold is closed. The wire can be bent in any suitable manner to create a usable bird spike, and preferably having first and second bends of at least 60°, and a bump of at least 1 mm between the first and second bends. The bump helps prevent the wire for rotating with the injected plastic in the completed bird spike.

A robot arm can advantageously be used to concurrently secure multiple straight wires from a wire holder platform, and positioned them onto the mold part. The multiple wires are preferably distanced between 2.5 cm and 6 cm apart, and arranged on the mold part such that their ends are staggered on the completed bird spike. The same robot arm is preferably used to remove the molded bird spike from the mold.

In some embodiments, the base of the complete bird spike includes the bends and bump, and also include throughholes and/or cutouts to reduce use of plastic, and to facilitate coupling of the base to a roof or other attachment surface. The base of completed bird spikes are preferably at least 15 cm long, and have upwardly directed, right and left side projections that facilitate attachment stability.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
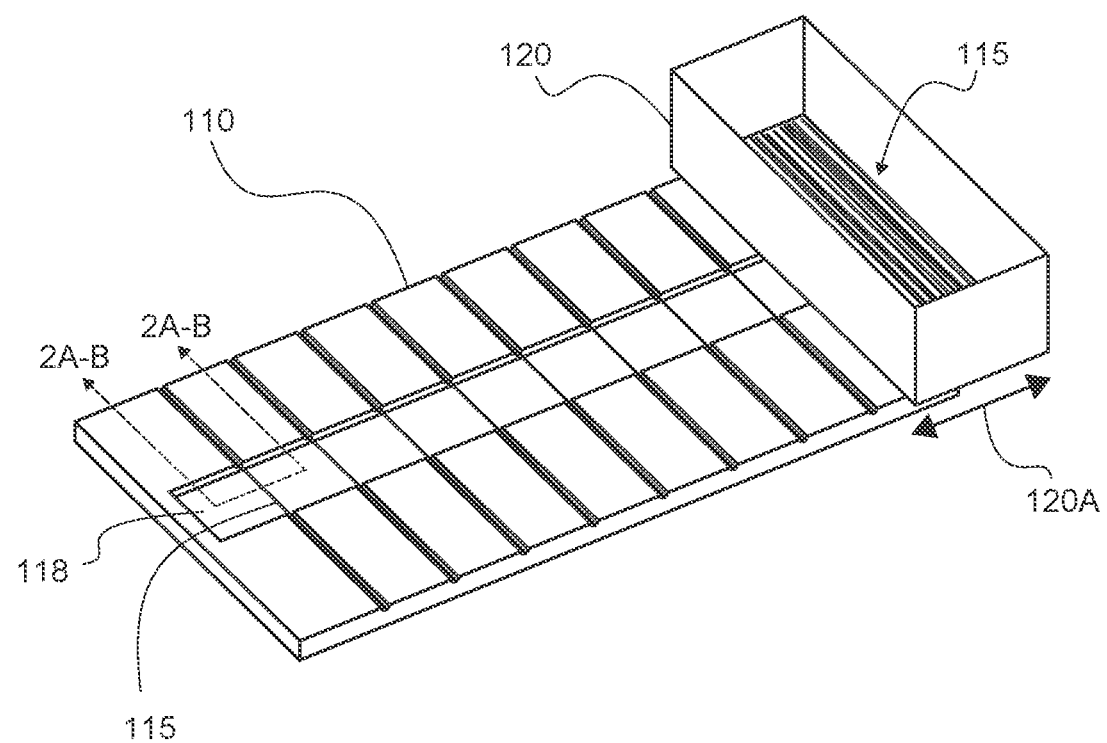
FIG. 1 is a perspective view of a wire hopper and wire holder platform.

In some embodiments, the numbers expressing quantities of ingredients, properties such as concentration, reaction conditions, and so forth, used to describe and certain embodiments are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments can be approximations, the numerical values set forth in the specific examples are reported as precisely as practicable. The numerical values presented in some embodiments can contain certain errors necessarily resulting from the standard deviation found in their respective testing measurements (e.g., ±1%, ±5%, or ±10%).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 2A:
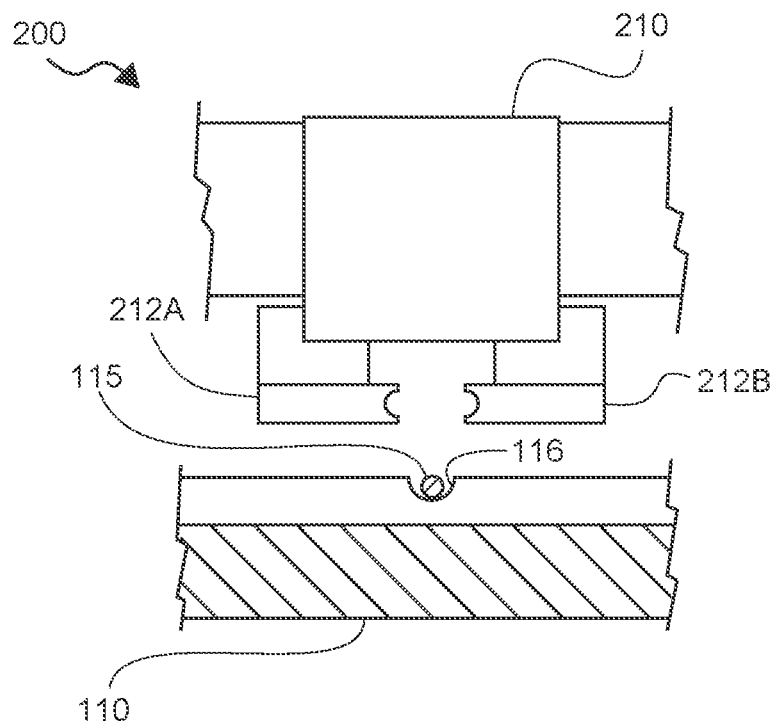
FIG. 2A is a vertical cross-section of a robotic arm assembly about to grab a wire from a wire holder platform.
Figure 2B:
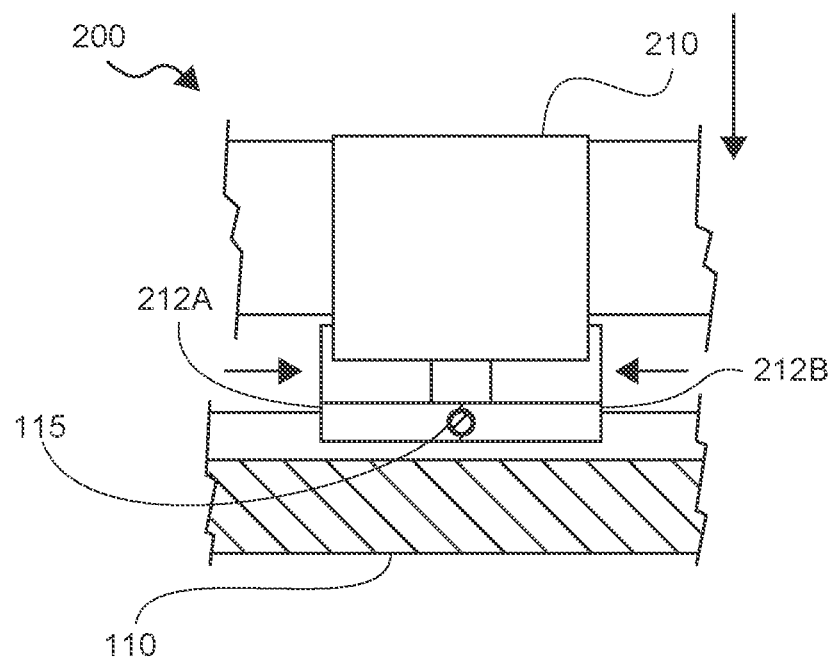
FIG. 2B is a vertical cross-section of a robotic arm assembly, having fingers about a grab a wire temporarily held in a wire holder platform.

FIG. 1 generally depicts a holder platform 110 having a hopper 120 that includes contains a plurality of wires 115. There is an opening at the bottom of hopper 120, so that as hopper 120 moves across platform 110, along direction 120A, individual wires 115 are dropped through the opening into each of the slots 116 of holder platform 110. In the depicted embodiment, there are 8 wires wire 115 disposed into the slots 116 of holder platform 110. An exemplary slot 116 is shown in FIGS. 2A and 2B. Slots 116 are positions 2.5-6 cm from each other, such that spikes on the deterrent device 700 will have an appropriate distancing for the size of birds to be deterred. There is a channel 118 running along the middle of platform 110, which allows space for pairs of fingers 212A, 212B of the robotic arm assembly 200 to grab each of the wires 115.

The holder platform 110 can be made of any suitable material, including for example stainless steel. The wires 115 are preferably stainless steel or other rust-resistant metal alloy. The cross-sectional shape of the wires 115 can be circular, rectangular, square, triangular, or any other suitable shape. Wires 115 can be any suitable length, from about 20 cm to 30 cm, depending on how high the spikes are intended to extend upwards from the base in the finished bird spike device. A most preferable length is about 25 cm. Wires 115 can also have any suitable width, but are advantageously about 0.8 mm to about 1.2 mm; strong enough to be durable under environmental conditions, and resist bending by birds and other animals. A most preferable width is about 1 mm.

For the hopper 120 to effectively drop wires 115 into the platform 110, the wires 115 need to be quite straight. To achieve sufficient straightness, wires cut from a wire roll typically need to be rolled prior to deposit into the hopper 120.

FIG. 2A depicts a robotic arm assembly 200 having a robotic arm 210, shown here in an open configuration, where wire 115 is positioned within a channel 118 holder platform 110. Robotic arm 210 has eight pairs of first and second fingers 212A, 212B, each of which cooperate to grab one of the eight wires 115 disposed in a corresponding one of the eight slots 116 of the holder platform 110.

FIG. 2B depicts the robot arm assembly 200 of FIG. 2A. However in FIG. 2B the displayed first and second fingers 212A, 212B are a closed configuration that is grabbing onto wire 115. Although not shown in FIG. 2B, the other seven pairs of first and second fingers would be concurrently grabbing onto the other seven wires.

Figure 3A:
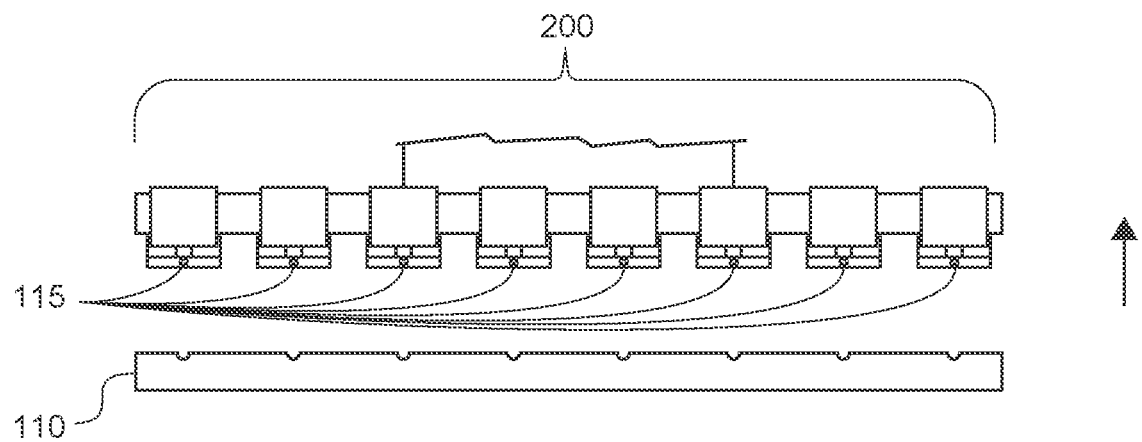
FIG. 3A is a cross-sectional side view of the robot arm assembly having picked up eight wires from the platform shown in FIG. 1.

FIG. 3A is a cross-sectional side view of the robot arm assembly 200 having picked up eight wires 115 from the platform 110. The robot arm assembly 200 then carries the eight wires over to the mold 400. In embodiments where the holder platform 110 is generally positioned horizontally, and the mold 400 is positioned generally vertically, the robot arm assembly 200 is rotated from a horizontal attitude to a vertical attitude before inserting the wires 115 into mold part 420.

Figure 3B:
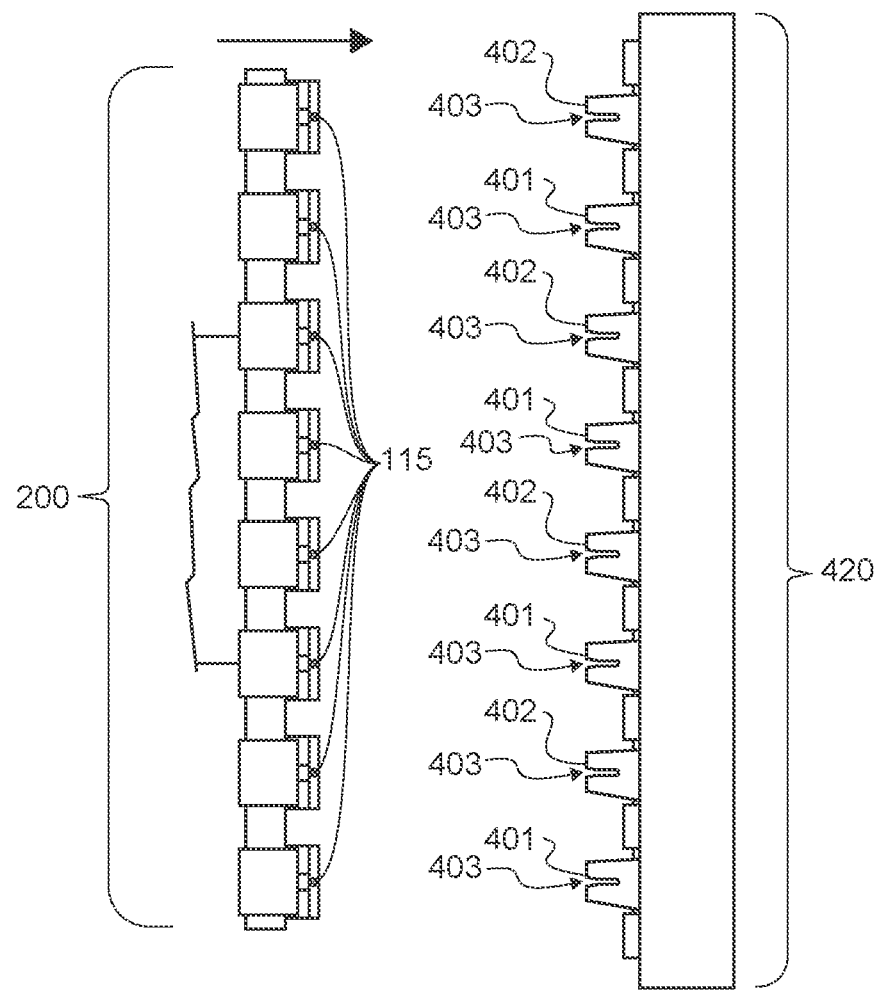
FIG. 3B is side view of a robotic arm assembly positioned to insert wires into a mold part.

FIG. 3B depicts robot arm assembly 200 with wires 115, and the first mold part 420 having first and second wire holders 401, 402. In a preferred embodiment, robot arm assembly 200 is configured to concurrently place the wires 115 into the slots 403 of the first and second sets of wire holders 401, 402, one wire 115 between each of the sets of wire holders 401, 402.

Figure 4A:
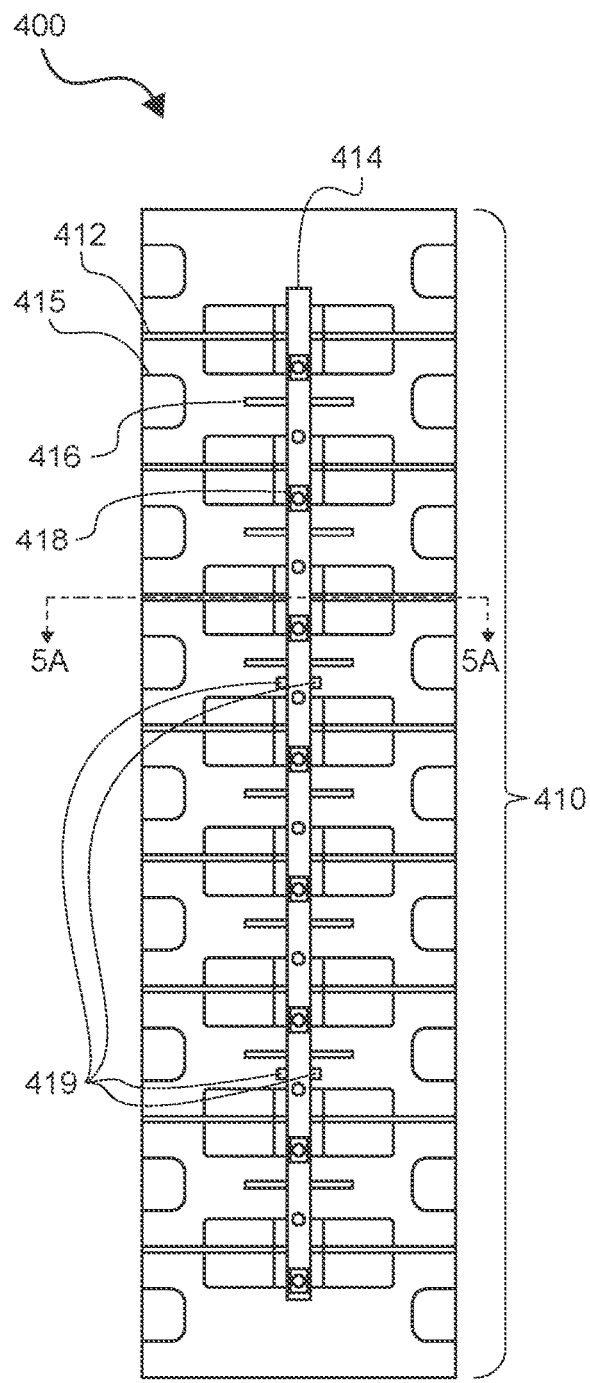
FIG. 4A is a plan view of a first mold part of a mold.

FIG. 4A depicts a first part 410 of mold 400, and generally includes an anvil 405, wire channels 412, longitudinal base channel 414 (and also 610 in FIG. 6B), wing channels 416, post channels 419, protrusions 418, alignment posts 415.

Figure 4B:
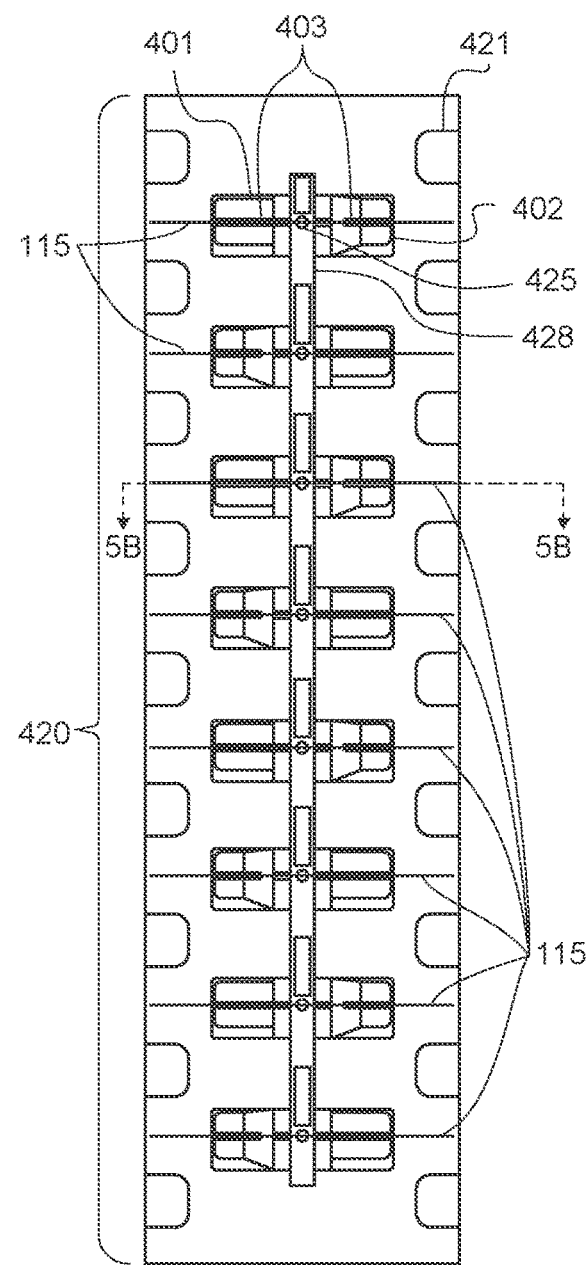
FIG. 4B is a plan view of a second mold part of a mold.

FIG. 4B depicts a second part 420 of mold 400, and generally includes the first and second projections 422, 426, projection bases 424, bead 425, and alignment holes 421.

Figure 5A:
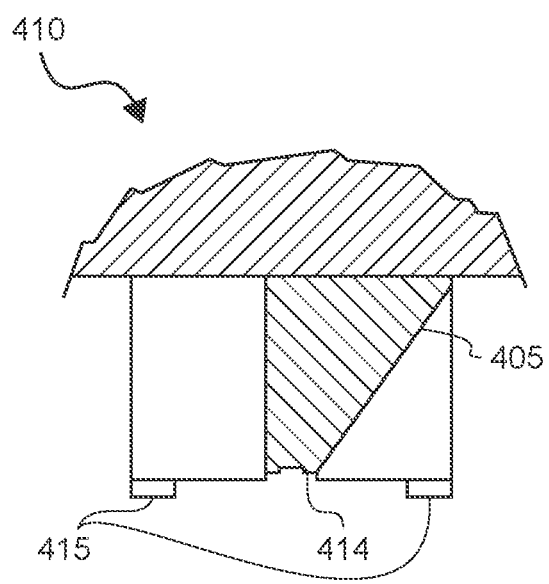
FIG. 5A is a cross section of the first mold part of FIG. 4A, across 5A-5A.

FIG. 5A is a cross section of mold part 410 across 5A-5A, showing anvil 405, alignment posts 415, and channel 414.

Figure 5B:
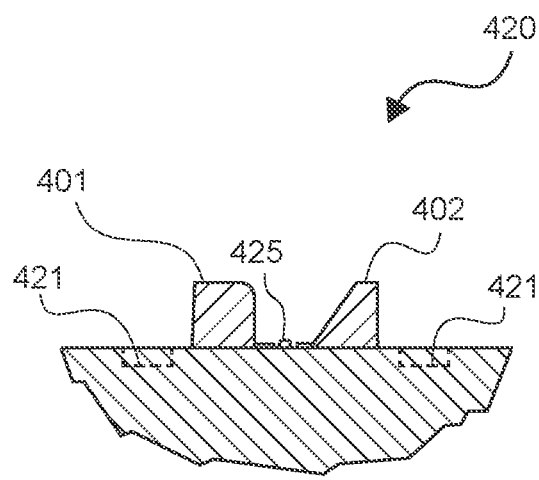
FIG. 5B is a cross section of the second mold part of FIG. 4B across 5B-5B.

FIG. 5B is a cross section of mold part 420 across 5B-5B, showing first and second projections 422, 426, and bead 425.

Figure 6A:
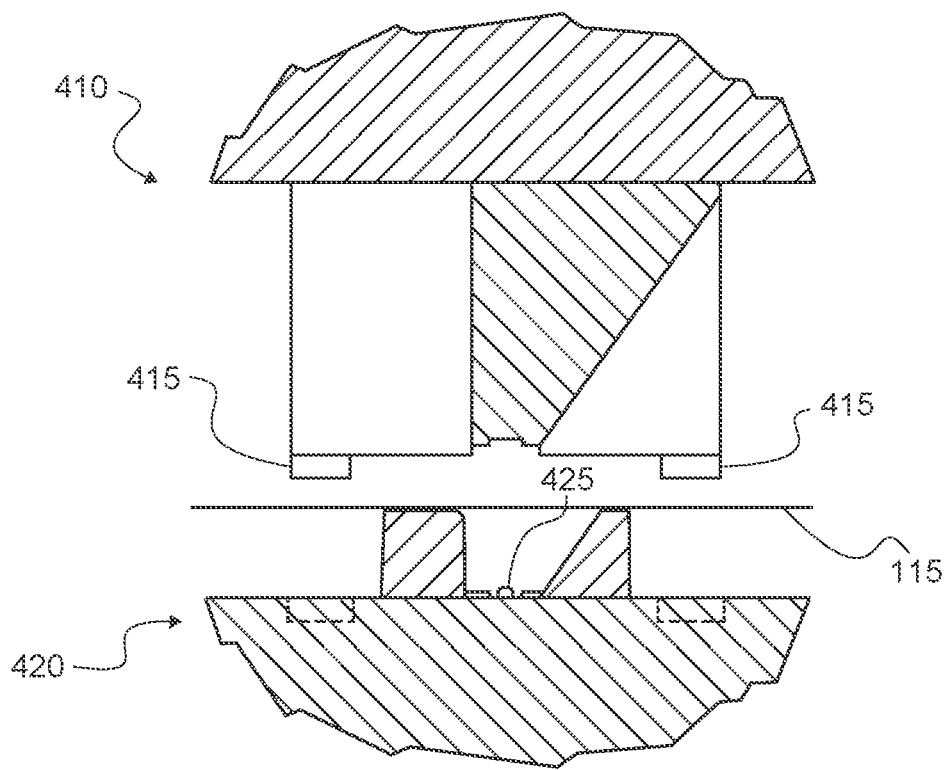
FIG. 6A depicts cross sections of separated first mold part of FIG. 4A, across 5A-5A, and second mold part of FIG. 4B across 5B-5B.

FIG. 6A depicts a cross-section of first mold part 410 distanced from a cross-section of second mold part 420, with wire 115 is positioned along first projection 422 and second projection 426 to produce a first bend in wire 115.

Figure 6B:
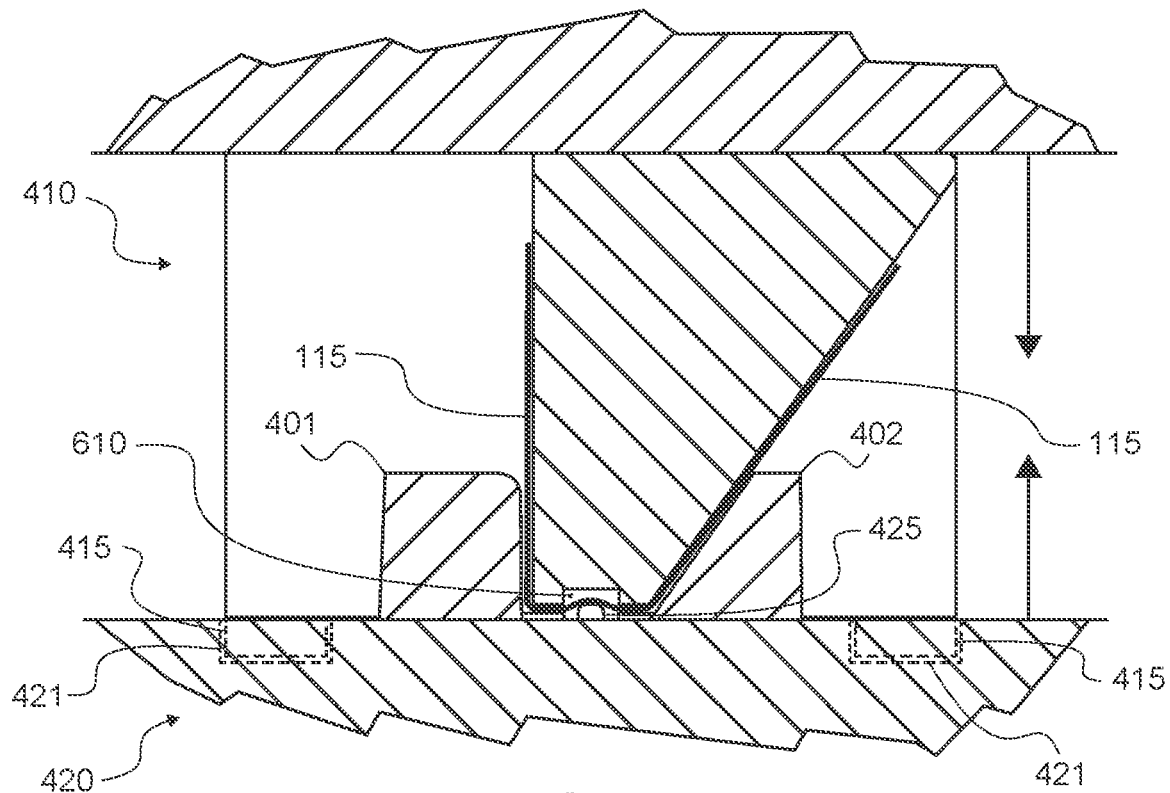
FIG. 6B depicts cross sections of mated first mold part of FIG. 4A, across 5A-5A, and second mold part of FIG. 4B across 5B-5B.

FIG. 6B depicts cross-sections of the first mold part 410 mated with the second mold part 420. Upon such mating, the multiple alignment posts 415 mate with corresponding alignment holes 421 to stabilize the mold 400, and each of the wires 115 are bent into a "W" formation. Bead 425 produces the bump 612 in each of the wires 115, and the first and second projections 422, 426 of mold part 420 cooperate with the anvil 405 and wire channels 412 of mold part 410, to bend the arms 622, 624 of each of the wires 115.

The bumps 612 produced in each of the wires 115 are sized and shaped to prevent the wire from rotating within the base 710. In preferred embodiments each of the bumps 612 is between 0.8 mm and 1.2 mm high, and is rounded by being bent by bead 425. Differently sized are shaped beads would produce differently sized or shaped bumps.

Figure 6C:
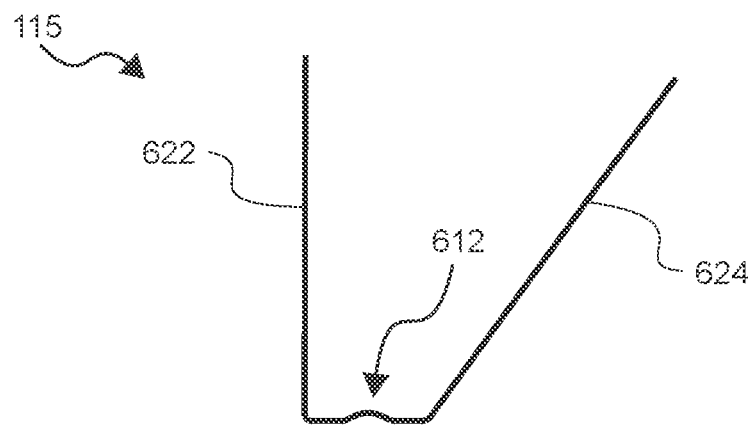
FIG. 6C depicts the wire in FIG. 6B in bent configuration.

Once the wires are bent as shown in FIGS. 6B and 6C, plastic is injected into the mold 400, filling the longitudinal base channel 414, wing channels 416, and post channels 419, to form the longitudinal, wing 740, and post 750 portions of the base 710, respectively.

With the wire 115 bent as shown, plastic is injected into mold 400, filling longitudinal base channel 414, wing channels 416, post channels 419. When solidified, such plastic forms base 710, wings 740, and posts 750, respectively. Within base 710 are holes 730 formed by protrusions 418.

Although not shown in any of the figures, the plastic of base 710 is not present below a middle portion of the wire, which is a result of the plastic being blocked by bead 425.

The arms 622, 624 on each of the wires 115 is preferably bent to have a first bend 613 of substantially 90°, and a second bend 614 of about 60°, both as measured from the plane of the bottom of base 710 (see FIG. 6C). The projections 422, 426 are preferably oriented such that the arms 622, 624 of adjacent wires 115 in the final deterrent device 700 alternate up and down (see FIG. 7). And although alternating 90° and 60° dispositions of the arms is desirable, other angles are also contemplated. For example, each of the arms could independently be angled anywhere between 60° and 110°, or even at other angles.

FIG. 6C depicts wire 115 in bent configuration having a bump 612, angles 613 and 614, and arms 622, 624.

Figure 7:
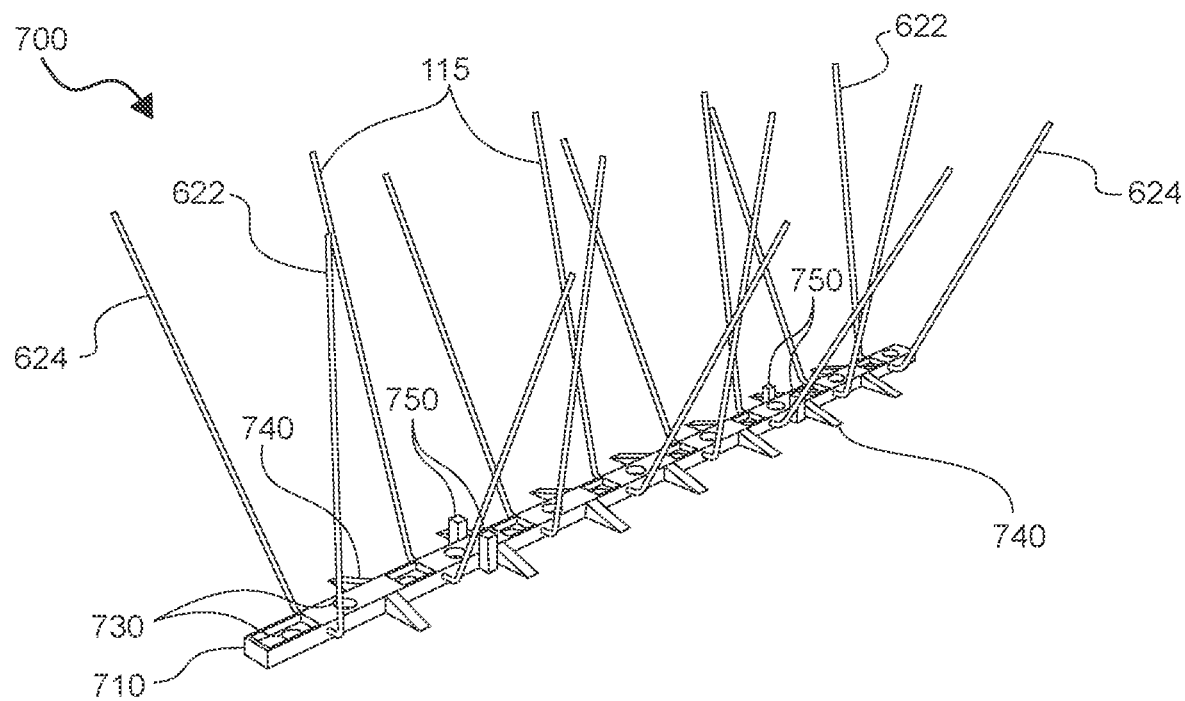
FIG. 7 is a perspective view of a preferred embodiment of a deterrent device produced by the mold of FIG. 2

FIG. 7 shows a perspective view of an embodiment of a deterrent device 700, generally including a base 710 with wings 740, posts 750, screw holes 730, and wires 115. Although not shown in FIG. 7, base 710 has a space underneath the bump 612, which occurs as an artifact of the injected plastic being obstructed by bead 425.

In the solidified bird spike device 700, each of the wires 115 has arms 622, 624 and a bump 612 (not shown), which prevents the wire 115 rotating within the deterrent base 710. The arms 622, 624 of the wires 115 now operate as spikes, oriented to prevent birds from landing. The arms 622, 624 of each wire 115 are preferably oriented with one arm of a wire pointed mostly upwards, and a corresponding arm on the same wire pointed mostly outwards, with the upwards and outwards orientations alternating (i.e., staggered) in adjacent wires 115 as shown.

Although not shown, base 710 is preferably molded to have a longitudinally running glue channel, about 3 mm wide. In typical installation, a portion of an adhesive is dispensed in the glue channel and on the bottom of the base 710. The adhesive then passes up through the holes 730 when the deterrent base 710 is pressed down upon a roof or other installation surface, to secure the device to the surface. Alternatively, screws or other fasteners could be positioned in the holes 730 to secure the base 710 to a surface. Holes 730 also serve to reduce the amount of plastic used in the base 710.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of manufacturing an insertion molded bird spike, using a mold having at least a first mold part, the method comprising:

positioning at least a first wire with respect to the first mold part;

while the first wire is positioned with respect to the first mold part, closing the mold and bending the first wire, wherein the bending occurs while or during the closing of the mold;

while the mold is closed and the bent first wire is within the closed mold, injecting a molten plastic about at least a bent portion of the bent first wire to form a base of the insertion molded bird spike, wherein the injecting occurs within the closed mold and the bent first wire is within the closed mold; and removing the insertion molded bird spike from the mold.

2. The method of claim 1, using a robotic arm to position the first wire with respect to the first mold part.

3. The method of claim 1, wherein the step of positioning comprises placing the first wire in first and second slots of first and second spaced apart holders, wherein the first and second spaced apart holders are part of the first mold part.

4. The method of claim 1, further comprising bending the first wire by mating the first mold part with a second mold part.

5. The method of claim 1, further comprising bending the first wire while the mold is closing.

6. The method of claim 5, further comprising bending the first wire such that when the insertion molded bird spike is removed from the mold, a first end of the first wire is substantially normal to a bottom of the base.

7. The method of claim 1, wherein the step of bending the first wire further comprises bending the first wire to produce a first bend of at least 60° and a second bend of at least 60°.

8. The method of claim 7, wherein the step of bending the first wire further comprises bending the first wire to insert a bump between the first and second bends, the bump having a height of at least 1 mm.

9. The method of claim 7, wherein the step of bending the first wire further comprises bending the first wire to insert a third bend between the first and second bends.

10. The method of claim 1, wherein the injected molten plastic comprises a polycarbonate.

11. The method of claim 1, further comprising straightening the first wire by rolling prior to the step of positioning.

12. The method of claim 1, further comprising in sequence, positioning a second wire with respect to the first mold part, bending the second wire, and injecting the molten plastic about at least a bent portion of the bent second wire, wherein the bent second wire is within the closed mold, and wherein the injecting occurs within the closed mold and the bent second wire is within the closed mold.

13. The method of claim 12, further comprising using a robot to position the first and second wires with respect to the first mold part.

14. The method of claim 12, further comprising bending the first and second wires such that ends of the first and second wires are staggered on the bird spike as removed from the mold.

15. The method of claim 12, further comprising positioning the second wire between 2.5 cm and 6 cm apart from the first wire.

16. The method of claim 12, wherein the mold includes projections configured to produce first and second throughholes, disposed between the first and second wires, in a base of the bird spike.

17. The method of claim 12, wherein the mold includes cutouts configured to provide first and second lateral supports in a base of the bird spike, between the first and second wires.

18. The method of claim 1, further comprising in sequence, positioning at least five additional wires with respect to the first mold part, bending the at least five additional wires, and injecting the molten plastic about at least bent portions of the at least five bent additional wires, wherein the bent wires are within the closed mold, and wherein the injecting occurs within the closed mold and the bent wires are within the closed mold.

19. The method of claim 18, further comprising using a robot to position the at least five additional wires with respect to the first mold part.

20. The method of claim 1, further comprising injecting a sufficient amount of the molten plastic to produce the bird spike with a length of at least 15 cm.

21. The method of claim 1, further comprising molding the bird spike to have a base with upwardly directed, right and left side projections.

22. The method of claim 21, further comprising using a robotic arm to press together first and second ones of the bird spikes, using the right and left side projections on the first one of the bird spikes to fit about a base of the second one of the bird spikes.

23. The method of claim 1, further comprising closing the mold by mating the first mold part with a second mold part, using a first side of a robotic arm to position the first wire with respect to the first mold part, and using a second side of the robotic arm to remove the insertion molded bird spike from the second mold part.

* * * * *